US011823245B2

(12) United States Patent
Ramachandran et al.

(10) Patent No.: US 11,823,245 B2
(45) Date of Patent: Nov. 21, 2023

(54) ENTERPRISE TAXONOMY MANAGEMENT FRAMEWORK FOR DIGITAL CONTENT MARKETING PLATFORM

(71) Applicant: Dell Products L.P., Round Rock, TX (US)

(72) Inventors: Venkat S. Ramachandran, Round Rock, TX (US); Naga Kalyan Kambapu, Austin, TX (US); Jonathan Cornish Byerly, Georgetown, TX (US); Nikhil Reddy Kota, Round Rock, TX (US); Pradeepta Ranjan Choudhury, Angul (IN); Hung Dinh, Austin, TX (US); Kannappan Ramu, Frisco, TX (US)

(73) Assignee: Dell Products L.P., Round Rock, TX (US)

( * ) Notice: Subject to any disclaimer, the term of this patent is extended or adjusted under 35 U.S.C. 154(b) by 329 days.

(21) Appl. No.: 16/917,195

(22) Filed: Jun. 30, 2020

(65) Prior Publication Data

US 2021/0406977 A1 Dec. 30, 2021

(51) Int. Cl.
*G06Q 10/00* (2023.01)
*G06Q 30/0601* (2023.01)
(Continued)

(52) U.S. Cl.
CPC ....... *G06Q 30/0631* (2013.01); *G06F 40/211* (2020.01); *G06F 40/30* (2020.01);
(Continued)

(58) Field of Classification Search
CPC .......... G06Q 30/0631; G06Q 30/0282; G06N 20/00; G06N 5/04; G06N 3/045;
(Continued)

(56) References Cited

U.S. PATENT DOCUMENTS 10,915,336 B1 * 2/2021 Ding .................... G06F 9/451
11,568,271 B1 * 1/2023 Bychkovsky .......... G06N 20/00
(Continued)

OTHER PUBLICATIONS

Kipp ("What is URL Tagging & How Do I Do It?" Marcel Digital; Sep. 6, 2018. Retreived at https://www.marceldigital.com/blog/what-is-url-tagging-how-do-i-do-it) (Year: 2018).*
(Continued)

*Primary Examiner* — Gabrielle A McCormick
(74) *Attorney, Agent, or Firm* — Ryan, Mason & Lewis, LLP

(57) ABSTRACT

A method includes generating a model for a content taxonomy using one or more machine learning (ML) techniques. The model comprises a plurality of metadata tags for electronic content. In the method, a plurality of electronic content items are received from a plurality of content management systems, and are analyzed using the one or more ML techniques. The method also includes assigning one or more of the plurality of metadata tags to each of the plurality of electronic content items based on the analysis, and transmitting to the plurality of content management systems via one or more application programming interfaces, a plurality of recommendations comprising which of the plurality metadata tags to apply to the plurality of electronic content items.

20 Claims, 12 Drawing Sheets

(51) Int. Cl.
  *G06Q 30/0282* (2023.01)
  *G06N 20/00* (2019.01)
  *G06F 40/30* (2020.01)
  *H04L 51/02* (2022.01)
  *G06F 40/211* (2020.01)
  *G06N 5/04* (2023.01)

(52) U.S. Cl.
  CPC .............. *G06N 5/04* (2013.01); *G06N 20/00* (2019.01); *G06Q 30/0282* (2013.01); *H04L 51/02* (2013.01)

(58) Field of Classification Search
  CPC ....... G06N 5/022; G06F 40/211; G06F 40/30; G06F 16/55; G06F 16/908; H04L 51/02
  See application file for complete search history.

(56) References Cited

U.S. PATENT DOCUMENTS

| | | | | |
|---|---|---|---|---|
| 2010/0030764 | A1* | 2/2010 | Koren | G06F 16/435 |
| | | | | 705/7.29 |
| 2020/0110839 | A1* | 4/2020 | Wang | G06F 16/38 |
| 2020/0364370 | A1* | 11/2020 | Krafcik | H04L 67/02 |

OTHER PUBLICATIONS

Singh, Jetinder ("The What, Why and How of a Microservices Architecture". HashmapInc. Jun. 7, 2018 retrieved at https://medium.com/hashmapinc/the-what-why-and-how-of-a-microservices-architecture-4179579423a9) (Year: 2018).*

Wikipedia, "Chatbot," https://en.wikipedia.org/w/index.php?title=Chatbot&oldid=955232861, May 6, 2020, 12 pages.

Wikipedia, "Computer Vision," https://en.wikipedia.org/w/index.php?title=Computer_vision&oldid=956031996, May 11, 2020, 16 pages.

Wikipedia, "Content Marketing," https://en.wikipedia.org/w/index.php?title=Content_marketing&oldid=956072062, May 11, 2020, 9 pages.

Wikipedia, "Digital Curation," https://en.wikipedia.org/w/index.php?title=Digital_curation&oldid=953062661, Apr. 25, 2020, 10 pages.

J. Brownlee, "Image Augmentation for Deep Learning with Keras," Deep Learning, https://machinelearningmastery.com/image-augmentation-deep-learning-keras/, Jun. 29, 2016, 53 pages.

Wikipedia, "Taxonomy (general)" https://en.wikipedia.org/w/index.php?title=Taxonomy_(general)&oldid=955160868, May 6, 2020, 7 pages.

B. Walli, "Taxonomy 101: The Basics and Getting Started with Taxonomies," https://en.wikipedia.org/w/index.php?title=Taxonomy_(general)&oldid=955160868, Aug. 15, 2014, 10 pages.

DPCI, "Taxonomy vs. Metadata," https://www.dpci.com/insights/taxonomy-vs-metadata, Accessed May 19, 2020, 5 pages.

Processwire, "URL Segments and Routing," https://processwire.com/docs/front-end/how-to-use-url-segments/, 2020, 8 pages.

Wikipedia, "Word2vec," https://en.wikipedia.org/w/index.php?title=Word2vec&oldid=955174662, May 6, 2020, 6 pages.

Tensor Flow Hub, "Elmo," Google, https://tfhub.dev/google/elmo/2, Apr. 22, 2020, 5 pages.

* cited by examiner

```
In [4]: import tensorflow_hub as hub
        import tensorflow as tf

In [5]: elmo = hub.Module("https://tfhub.dev/google/elmo/2", trainable=True)

In [6]: def elmo_vectors(x):
          embeddings = elmo(x.tolist(), signature="default", as_dict=True)["elmo"]

with tf.Session() as sess:
            sess.run(tf.global_variables_initializer())
            sess.run(tf.tables_initializer())
            # return average of ELMo features
            return sess.run(tf.reduce_mean(embeddings, 1))
```

```
In [58]: elmo_train[0]
Out[58]: array([[ 0.08392911,  0.16088805, -0.05453942, ..., -0.3910442 ,
         0.04705489, -0.01791243],
       [-0.02581972,  0.22651161, -0.07423852, ..., -0.16298306,
         0.21150316, -0.04931534]], dtype=float32)

In [59]: from sklearn.metrics.pairwise import cosine_similarity
         print(cosine_similarity(elmo_train[0], elmo_train[0]))

ENTERPRISE TAXONOMY MANAGEMENT FRAMEWORK FOR DIGITAL CONTENT MARKETING PLATFORM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to computing environments, and more particularly to techniques for information processing in a content marketing system.

BACKGROUND

Content marketing refers to a marketing technique based on the distribution of content in multiple formats for a targeted audience. Enterprises pursuing content marketing attempt to determine the needs of prospective customers and then present information related to these needs to their customers. The information is in various formats such as, but not necessarily limited to, articles, blogs, video blogs (vlogs), videos, electronic books (e-books), podcasts, how-to-guides and news items. Many of these formats can be obtained through digital mediums such as, for example, online via the Internet.

In the digital age, enterprises often use content marketing to connect with buyers, to reinforce brand messages and to build brand awareness. As the universe of potential content can be very large, there are various challenges associated with digital content marketing such as, for example, budgetary and resource constraints, and limited mechanisms for the selection and delivery of high quality and consistent content to customers over limited time periods.

Current systems for the categorization and recommendation of content require defining a process workflow and assembling a stack of methods to process different types of content in different ways. With conventional techniques, designing and validating a content processing workflow requires multiple human-driven judgments and extensive knowledge of large numbers of customers and a myriad of content sources. As a result, under current practices, administrators and other personnel face time consuming procedural tasks when developing and executing content categorization and distribution applications.

SUMMARY

Illustrative embodiments correspond to techniques for using different machine learning (ML) functionalities and algorithms to combine and classify content with high accuracy and distribute content recommendations to customers. Embodiments advantageously utilize ML techniques such as deep learning, computer vision and chatbots to automatically categorize content, determine relevance of content for different customers and process customer feedback.

In one embodiment, a method comprises generating a model for a content taxonomy using one or more machine learning (ML) techniques. The model comprises a plurality of metadata tags for electronic content. In the method, a plurality of electronic content items are received from a plurality of content management systems, and are analyzed using the one or more ML techniques. The method also includes assigning one or more of the plurality of metadata tags to each of the plurality of electronic content items based on the analysis, and transmitting to the plurality of content management systems via one or more application programming interfaces, a plurality of recommendations comprising which of the plurality metadata tags to apply to the plurality of electronic content items.

These and other illustrative embodiments include, without limitation, methods, apparatus, networks, systems and processor-readable storage media.

BRIEF DESCRIPTION OF THE DRAWINGS

FIGS. 6, 7 and 8 depict example pseudocode for determining word similarities in illustrative embodiments.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "natural language processing (NLP)" can refer to interactions between computers and human (natural) languages, where computers are able to derive meaning from human or natural language input, and respond to requests and/or commands provided by a human using natural language.

As used herein, "natural language understanding (NLU)" can refer to a sub-category of natural language processing in AI where natural language input is disassembled and parsed to determine appropriate syntactic and semantic schemes in order to comprehend and use languages. NLU may rely on computational models that draw from linguistics to understand how language works, and comprehend what is being said by a user.

Figure 1:
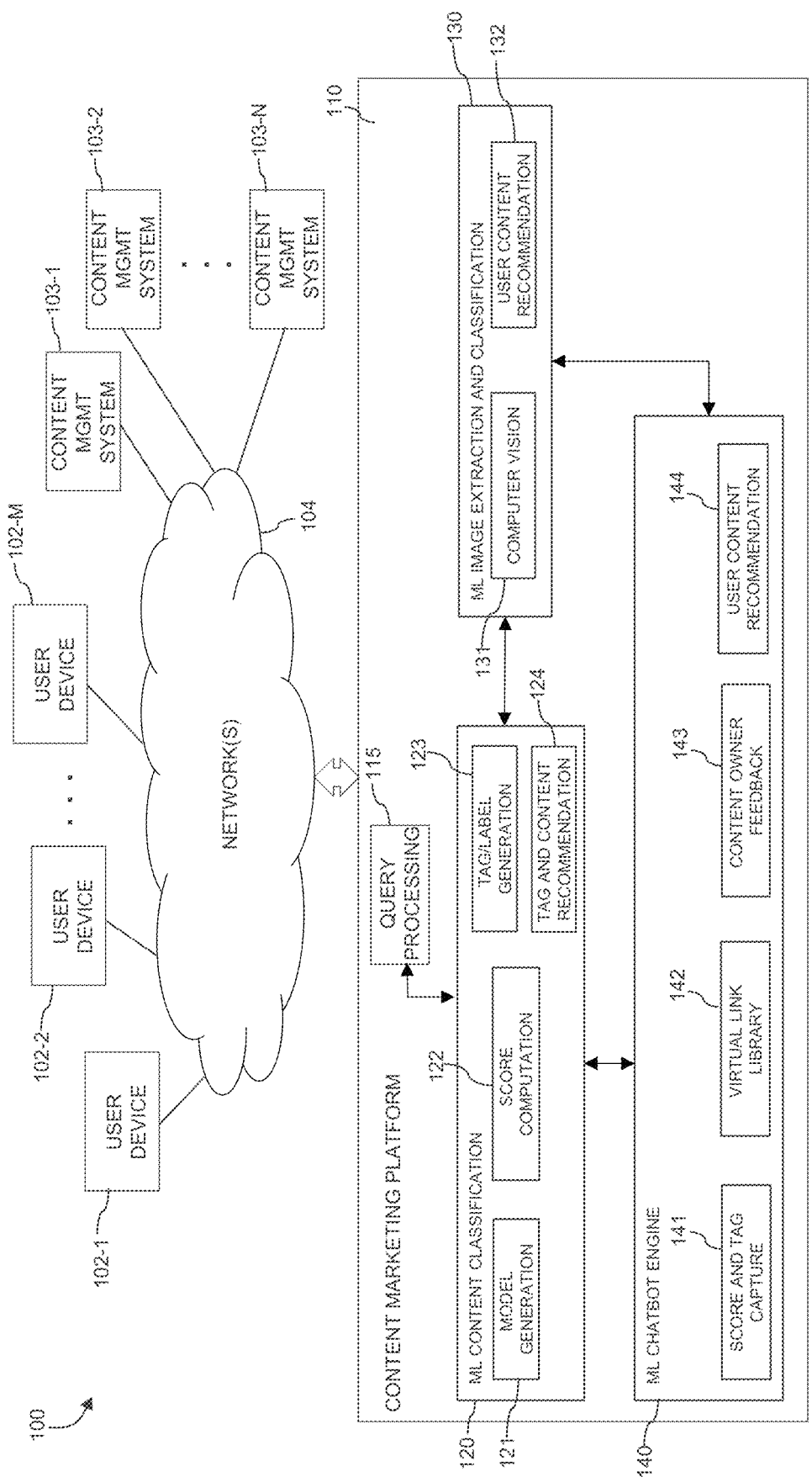
FIG. 1 is a block diagram of an information processing system comprising a content marketing platform configured for classifying and recommending content in an illustrative embodiment.

FIG. 1 shows an information processing system 100 configured in accordance with an illustrative embodiment. The information processing system 100 comprises user devices 102-1, 102-2, ... 102-M (collectively "user devices 102"), and content management systems 103-1, 103-2, ... 103-N (collectively "content management systems 103"). The user devices 102 and communicate over a network 104 with a content marketing platform 110.

The user devices 102 can comprise, for example, Internet of Things (IoT) devices, desktop, laptop or tablet computers, mobile telephones, or other types of processing devices capable of communicating with the content marketing platform 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable M and other similar index variables herein such as K, L and N are assumed to be arbitrary positive integers greater than or equal to two.

The content management systems 103 receive, manage, store and transmit electronic content. As used herein, "electronic content" or "content" comprises, but is not necessarily limited to, information in various formats accessible via a computer or other processing device. The formats include, but are not necessarily limited to, articles, guides, manuals, papers, blogs, presentations and other documents or written materials in digital or electronic form, vlogs, videos, audio files, electronic books (e-books), podcasts, and other information containing materials which can be obtained through digital mediums such as, for example, online via the Internet. As used herein, an "electronic content item" or "content item" refers to, for example, an electronic data or content source, such as a document in digital or electronic form, a vlog, a video, an audio file, an e-book, a podcast or other electronic information containing material.

The content management systems 103 each comprise, for example, one or more servers, storage platforms, applications, databases and other components for receiving, managing, storing and transmitting electronic content. The content management systems 103 can be affiliated with one or more enterprises and can be internally controlled and managed by the enterprise or externally controlled by an outside entity with respect to the enterprise. Each of the content management systems 103 may have hundreds or thousands of authors or other content creators transmitting or pushing electronic content items to the content management systems 103 and/or the content management systems 103 may pull the electronic content items from different sources across the Internet. According to one or more embodiments, the content management systems 103 each use different taxonomies for organizing and classifying their corresponding electronic content. The different taxonomies are not standardized and are not consistent.

As used herein, a "taxonomy" or "content taxonomy" refers to a system for organizing data into categories and subcategories. A "hierarchical taxonomy" indexes content items according to broader categories and more specific sub-categories which stem from one or more of the categories. Taxonomies assist with the identification and retrieval of electronic content, and are useful for identifying and retrieving electronic content corresponding to particular topics that may be, for example, targeted to specific users in a content marketing scenario or the subject of a search or query. According to one or more embodiments, electronic content is labeled with one or more metadata tags corresponding to a given taxonomy. For example, depending on which categories and sub-categories a given electronic content item corresponds to, the given electronic content item is labeled with metadata tags corresponding to those categories and sub-categories.

The term "client," "customer," or "user" herein is intended to be broadly construed so as to encompass numerous arrangements of human, hardware, software or firmware entities, as well as combinations of such entities. Content marketing and/or content classification services may be provided for users and/or content management systems utilizing one or more ML models, although it is to be appreciated that other types of infrastructure arrangements could be used. At least a portion of the available services and functionalities provided by the content marketing platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the content marketing platform 110, as well as to support communication between the content marketing platform 110 and connected devices (e.g., user devices 102) and/or other related systems and devices not explicitly shown.

In some embodiments, the user devices 102 are assumed to be associated with repair technicians, system administrators, information technology (IT) managers, software developers or other authorized personnel configured to access and utilize the content marketing platform 110.

The content marketing platform 110 in the present embodiment is assumed to be accessible to the user devices 102 and the content management systems 103 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The content marketing platform 110, on behalf of respective infrastructure tenants each corresponding to one or more users associated with respective ones of the user devices 102, provides for standardized content classification and recommendations for content labeling and distribution using ML techniques. According to the embodiments, the content marketing platform 110 uses an optimized ML framework with multiple functionalities and algorithms such as, for example, deep learning, computer vision and AI chatbots, to apply a specific taxonomy to incoming content from multiple content management systems 103. The ML techniques used by the content marketing platform 110 are based on a descriptive and precise taxonomy for content marketing, so that a standardized vocabulary can be applied to non-standardized incoming content to create new metadata labels for the content pursuant to the content marketing taxonomy. The content marketing platform 110 identifies and categorizes the incoming content against the standardized taxonomy so that appropriate content can be delivered to customers in content market scenarios, and recommendations can be provided to the content management systems 103 regarding how to label their content in accordance with the standardized taxonomy.

Referring to FIG. 1, the content marketing platform 110 includes a query processing engine 115, an ML content classification engine 120, an ML image extraction and classification engine 130 and an ML chatbot engine 140. The ML content classification engine 120 includes a model generation component 121, a score computation component 122, a tag/label generation component 123 and a tag and content recommendation component 124. The ML image extraction and classification engine 130 includes a computer vision component 131 and a user content recommendation component 132. The ML chatbot engine 140 includes a score and tag capture component 141, a virtual link library 142, a content owner feedback component 143 and a user content recommendation component 144.

The ML content classification engine 120 uses one or more ML techniques to generate a model for a content classification taxonomy. The model comprises a plurality of metadata tags for labelling electronic content received from the plurality of content management systems 103. Referring to the microservice architecture of FIG. 2, the generation of the ML model for the content classification taxonomy is described in more detail. The application registration and modelling microservices 250 generate the standardized taxonomy based on data from multiple sources, including, for example, multiple applications 251, and multiple content sources 252, such as databases and workload environments comprising content applying the standardized taxonomy.

The applications 251 provide data to an input component 253. The data includes the defined categories and/or classes 255 and features and/or rules 257 of the taxonomy. For example, the categories and/or classes 255 correspond to the defined categories and sub-categories of the taxonomy, and the features and/or rules 257 correspond to defined characteristics and parameters of the taxonomy, such as, for example, how the categories and sub-categories are applied to the electronic content items, the type of taxonomy (e.g., hierarchical taxonomy), how the taxonomy is modified, etc. The data received from the applications 251 also includes defined document-category, feature-rule, and application-model mapping data 259. The mapping data 259 includes, for example, relationships between particular documents and categories of the taxonomy, features and their corresponding rules, and how particular applications are related to parts of the taxonomy model. The application registration and modelling component 250 also includes a derivation component 263, which includes categories and/or classes 265 and features and/or rules 267 similar to the defined categories/classes 255 and features/rules 257, but instead of being pre-defined, are derived from the content sources 252 through one or more ML techniques. The derivation component 263 further includes an input/output testing component 269, which as described further herein, receives input from a feedback, accuracy and correction microservices 290 regarding modifications to make to the model based on feedback from customers and scoring. Microservices include, but are not necessarily limited to, collections of loosely coupled, fine-grained and parallelized services implementing lightweight protocols.

The model generation component 121 uses the ML techniques to create a plurality of keyword and/or key phrase combinations. For example, referring to the operational flow diagram in FIG. 3, the model generation component 121 uses or more of the ML techniques to extract synonyms from customer keyword or key phrase search queries 363 and customer feedback 364. The customer keyword or key phrase search queries 363 and customer feedback 364 are provided via one or more user devices 102 from customers searching for content and providing feedback about consumed content. The model generation component 121 utilizes NLP and ML techniques to process natural language (e.g., English, Spanish or other spoken language) queries and feedback to determine similar queries and/or similar feedback and extract synonyms from the queries and feedback that may be used in natural language. The extracted synonyms are used to refine the ML processes being used to build a virtual library 357. The virtual library 357 is a database comprising labels (e.g., metadata tags) that can be applied to different content based on the standardized taxonomy. According to an embodiment, the tags/labels are applied to links for content items that have been crawled.

The ML techniques to create the keyword and/or key phrase combinations comprise, for example, a Word2vec technique, a bag of words (BoW) technique and/or a term frequency-inverse document frequency (tf-idf) technique. For example, according to an embodiment, the score computation component 122 computes a plurality of tf-idf scores for the plurality of combinations. In determining frequencies of use of words in the search queries 363 and customer feedback 364, tf-idf is utilized to identify and rank key words or phrases based on a term or phrase's frequent appearance in a particular query or feedback and lack of or infrequent appearance in a corpus, wherein the corpus is, for example, a plurality of natural language queries or multiple feedback instances. For example, tf-idf refers to a numerical statistic reflecting the importance of a word to a query with respect to a corpus. The tf-idf value increases proportionally to the number of times a word appears in the query, but is also offset by the frequency of the word in the corpus, taking into account that some words are generally more common than others. It is to be understood that the embodiments are not limited to the use of tf-idf. Computed similarities between words or phrases can be based on, for example, distance metrics such as, but not necessarily limited to, Euclidean, Mahalanobis, cosine and propensity score metrics.

FIGS. 6, 7 and 8 depict example pseudocode 600, 700 and 800 for determining word similarities in illustrative embodiments.

Figure 3:
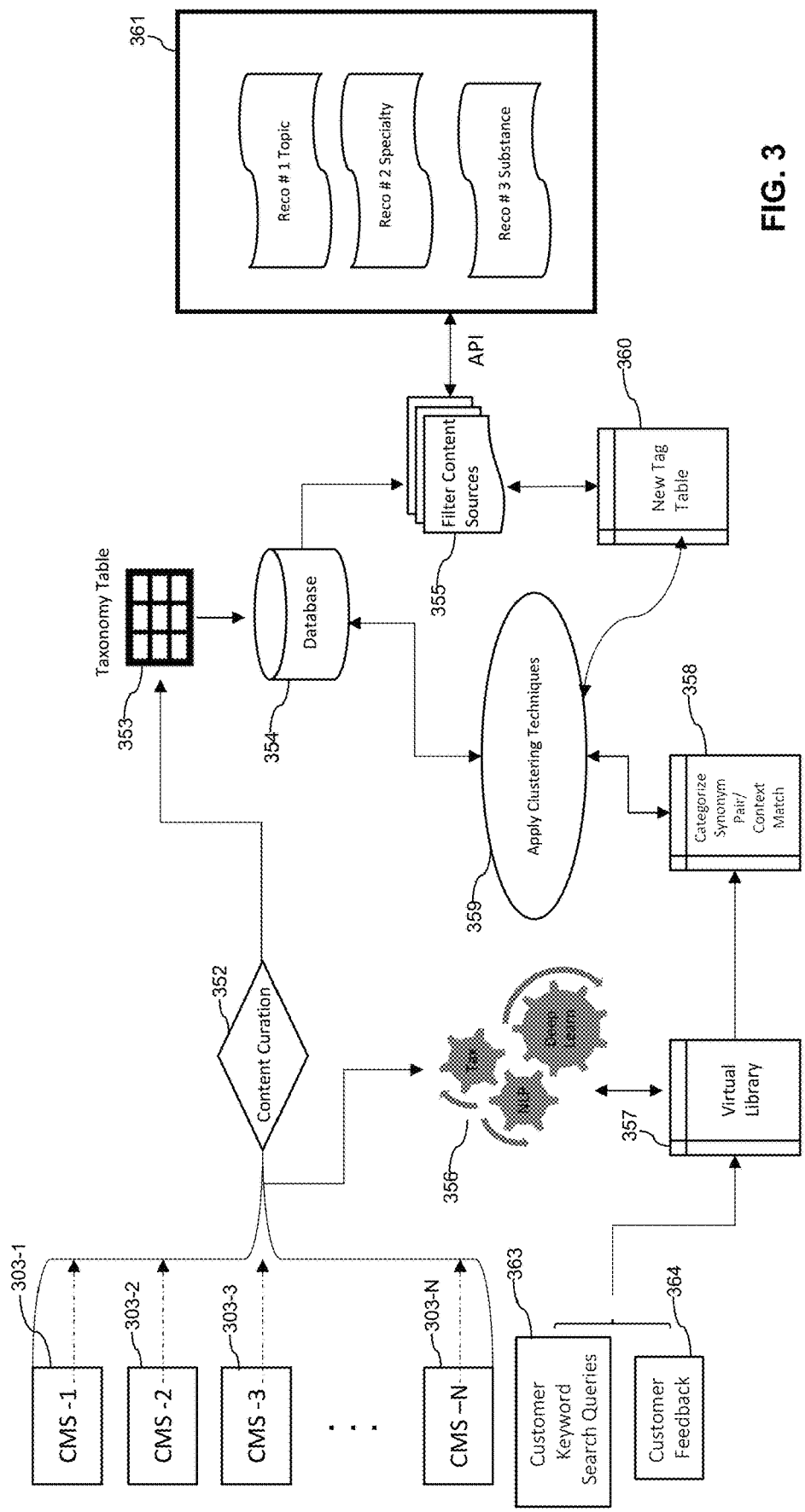
FIG. 3 is an operational flow diagram for content classification in an illustrative embodiment.

Referring to FIGS. 1 and 3, the model generation component 121 uses content source input from content management systems 303-1, 303-2, . . . 303-N (collectively "content management systems 303") (or content management systems 103) to apply deep learning with content drill down methods to create the virtual library 357. The model generation component 121 applies the content classification taxonomy to the electronic content items from the content management systems 103/303 using NLP and deep learning to generate the virtual library 357 (see FIG. 3, element 356). As noted above, the virtual library 357 is a database comprising labels (e.g., metadata tags) based on the standardized taxonomy which, according to an embodiment, comprises a hierarchical taxonomy. Other examples of taxonomies that can be utilized by the embodiments include a flat taxonomy, a network taxonomy and a facet taxonomy.

Using one or more ML techniques, the tag/label generation component 123 classifies the incoming electronic content items and assigns tags/labels to the electronic content items based on the standardized taxonomy and classifications. According to an embodiment, the metadata tags/labels are formatted as a plurality of virtual links, each virtual link comprising a plurality of uniform resource locator (URL) segments. For example, an electronic content item is assigned a virtual link comprising the metadata tags/labels as a plurality of URL segments.

The labels/tags can be generated in real-time once the content is received from the content management systems 103/303. As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which the embodiments are implemented, other appropriate timescales that provide at least contemporaneous performance and output can be achieved.

Referring back to FIG. 3, the electronic content items received from the content management systems 303 (or 103) are curated (block 352). According to an embodiment, content curation 352 comprises receiving the content from the variety of content management systems 103/303 and organizing the content based on one or more rules or directives, which may include, for example, directives regarding categorizing or classifying the content, legal guidelines, storage/database assignments, security measures to maintain data integrity, data accessibility, and transformation of the data into different digital formats. The directives regarding categorizing or classifying the content are based, at least in part, on the standardized taxonomy. Following content curation 352, the electronic content is organized into one or more taxonomy tables 353. The ML techniques apply the standardized taxonomy to the content to define the dimensions, relationships and headings in the taxonomy table(s) 353. For example, the taxonomy tables can include relationships between content sources, and tags and/or labels associated with the content sources.

The one or more taxonomy tables 353 are stored in a database 354. According to an embodiment, the database 354 also includes information about customers to which the content items are being sent in a content marketing scenario, as well as information about existing or previously used tags/labels that may have been used to tag/label previous content that has been received by the content marketing platform 110 and/or sent to customers. The customer and tag information can be in tabular format, or in another format in the database 354.

Referring to block 355, logical conditions (AND, NOT, OR, etc.) are applied to the data from the database 354 to filter the content sources that are provided to customers for content marketing. Referring to block 359, ML clustering techniques, such as, for example, k-means clustering, are applied to the data from the database 354 to find, for example, groups of related customers, URLs, topics, specialties, contents, etc.

Referring to block 358, a graph based model of the tags or labels from the virtual library 357 is generated to define groups of synonyms and/or context matches in the tags or labels, and to reduce noise in the data. According to an embodiment, the groups of synonyms and/or context matches are defined by probabilistic methods. For example, if a probability of being a synonym or context match exceeds a predetermined threshold, synonymous tags or labels and/or context matches between the tags and/or labels are determined. Further, related content items can be identified based on tags or labels which were applied to links for the content items and found to be synonymous and/or context matches.

Referring to block 360, a new tag table is created based on the clustered data and the synonymous tags/labels and/or context matches. The new tag table comprises a newly generated tag for each content item and the corresponding virtual link comprising the plurality of URL segments for each content item. The newly generated tag is generated by the tag/label generation component 123.

Referring to block 361, a plurality of recommendations comprising which of the plurality metadata tags to apply to different electronic content items are transmitted to the plurality of content management systems 303 (or 103) via one or more application programming interfaces (APIs). As used herein, "application programming interface (API)" refers to a set of subroutine definitions, protocols, and/or tools for building software. Generally, an API defines communication between software components. APIs permit programmers to write software applications consistent with an operating environment or website.

According to an embodiment, the plurality of recommendations are categorized according to topic, specialty and/or substance. In more detail, topics refer to general subjects, solutions and/or concepts, specialties refer to areas of expertise, and substance refers to specific material and/or main ideas within a given electronic content item. Accordingly, tags are generated and recommended for content based on, for example, a topic of an electronic content item, a specialty to which an electronic item relates and/or the substance of an electronic content item.

The recommendations are generated by, for example, the tag and content recommendation component 124. The tag and content recommendation component 124 is also configured to generate recommendations for content that is to be transmitted to customers for content marketing.

Figure 2:
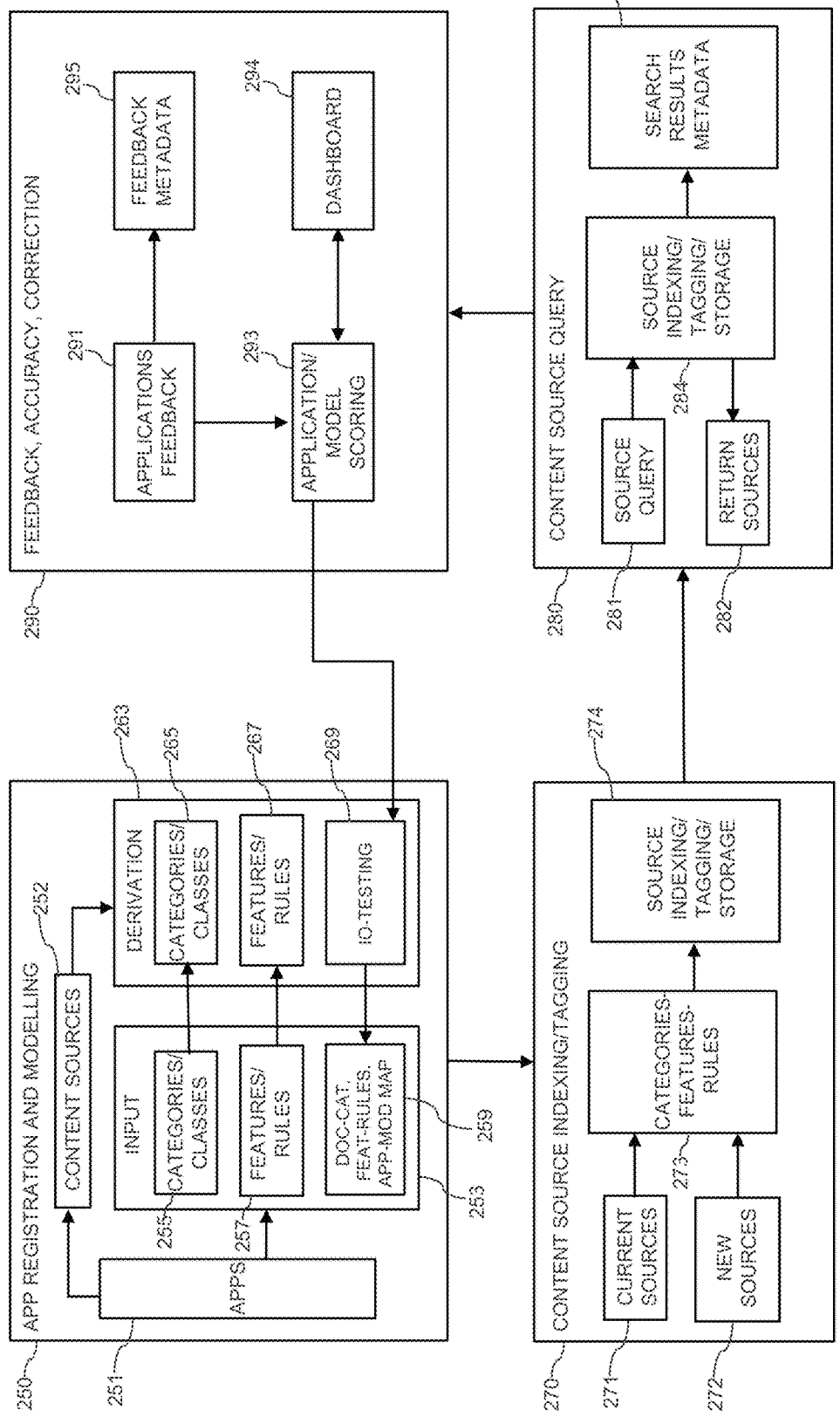
FIG. 2 is a block diagram of a microservice architecture for content management in an illustrative embodiment.

The microservice architecture supporting the classification and tagging of content sources is described in connection with FIG. 2. As shown in FIG. 2, content source indexing/tagging microservices 270 are utilized to assign and/or identify categories, features and rules for current content sources 271 and new content sources 272. Current content sources 271 comprise content sources already received from the content management systems 103/303 and/or currently being stored by the platform 110. New content sources 272 comprise content sources being crawled on the Internet to be retrieved from a variety of locations including, but not necessarily limited to, websites, social media platforms, online databases, etc. The content source indexing/tagging microservices 270 include categories-features-rules microservice 273 which performs functions described in connection with FIGS. 1 and 3 to assign and/or identify categories, features and rules for the current and new content sources 271 and 272. The content source indexing/tagging microservices 270 also include content source indexing, tagging and storage microservice 274 which performs functions described in connection with FIGS. 1 and 3 to classify, index and tag current and new content sources 271 and 272 according to the standardized taxonomy. The content source indexing, tagging and storage microservice 274 also performs functions described in connection with FIGS. 1 and 3 to store tag/label libraries, taxonomy rules, taxonomy tables, tag tables, customer tables and other elements related to the indexing and tagging of content sources 271 and 272.

Referring to FIGS. 1 and 2, the content marketing platform 110 includes a query processing engine 115 to process queries for content sources initiated by customers. According to an embodiment, the query processing engine 115 utilizes content source query microservices 280 to process incoming queries, utilize the queries in connection with building the virtual library 357 as described in connection with FIG. 3, index and tag the content sources in the search results and maintain search result metadata. The content source query microservices 280 include a source query microservice 281 which processes incoming queries for content from customers via, for example, user devices 102. Similar to the content source indexing/tagging microservices 270, the content source query microservice 280 also include content source indexing, tagging and storage microservice 284 which performs functions described in connection with FIGS. 1 and 3 to classify, index and tag content sources found in the queries according to the standardized taxonomy. The content source indexing, tagging and storage microservice 284 also performs functions described in connection with FIGS. 1 and 3 to store tag/label libraries, taxonomy rules, taxonomy tables, tag tables, customer tables and other elements related to the indexing and tagging of found content sources. The search results metadata microservice 285 stores and maintains metadata associated with the query results, and the return sources microservice 282 returns found content sources that have been tagged/labelled to the customers in response to the queries.

As noted above, the ML image extraction and classification engine 130 includes a computer vision component 131 and a user content recommendation component 132. The computer vision component executes ML computer vision algorithms to extract conclusions from images in content, such as, for example, images that may be part of electronic documents. The computer vision component 131 applies the standardized taxonomy to an image to classify the image and assign a tag/label to the image based on the taxonomy.

Figure 4:
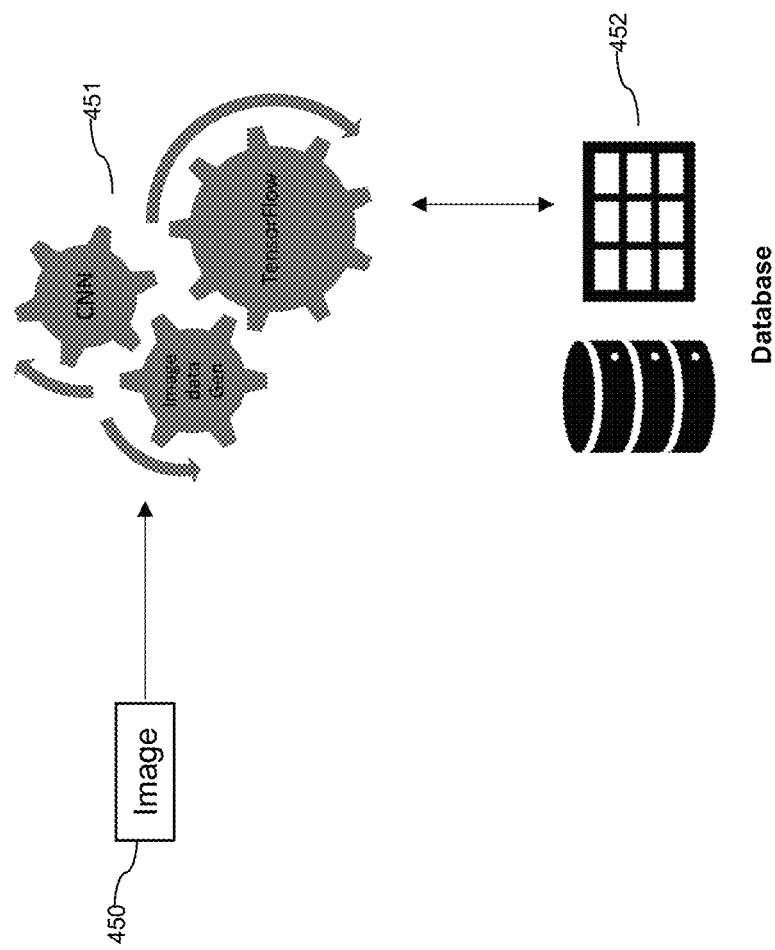
FIG. 4 is an operational flow diagram for image extraction and classification in an illustrative embodiment.

Referring to FIG. 4, for example, the computer vision component 131 extracts an image 450 from a given electronic content item, and utilizes ML algorithms 451, such as, for example, convolutional neural networks (CNNs), an image data generator (e.g., Keras image data generator) and/or TensorFlow® techniques, to perform image processing and to assign one or more metadata tags/labels to the image 450. The one or more metadata tags/labels are sent to and stored in a database 452, such as in a tag table in a database. The image and the tag are associated with the electronic content item in the database 452. According to an embodiment, a new tag is created that is associated with the image.

The computer vision component 131 uses ML techniques to automatically extract, analyze and understand information from images. Computer vision techniques comprise the development of algorithms to automatically understand and derive information from images. The image data can be in many forms, including, but not necessarily limited to video and still images. A data image data generator may be configured to perform sample and feature-wise standardization, whitening, rotation, shifts, shear flips, dimension reordering, and other forms of image augmentation.

If electronic content items, such as, for example, articles are enriched with image tags, the accuracy of the selected content to be marketed to customers can be increased. According to one or more embodiments, the user content recommendation component 132 of the ML image extraction and classification engine 130 use one or more AI/ML techniques, such as, for example, deep learning, to determine whether one or more of a plurality of electronic content items other than a given electronic content item from which the image has been extracted is related to the extracted image. The determination is based on identified similarities between image features concluded by the computer vision component 131 and text attributes of the plurality of electronic content items.

The ML chatbot engine 140 integrates AI chatbot functionality to receive customer views, opinions and other feedback regarding received content, and recommend in real-time similar content or content better-suited for the customer based on the tags/labels of the electronic content items. As used herein, a "chatbot" refers to software for conducting a conversation with a user via verbal or textual methods. A chatbot uses NLP and NLU techniques to process verbal (e.g. spoken) and textual natural language responses and/or ratings from a user.

Figure 5:
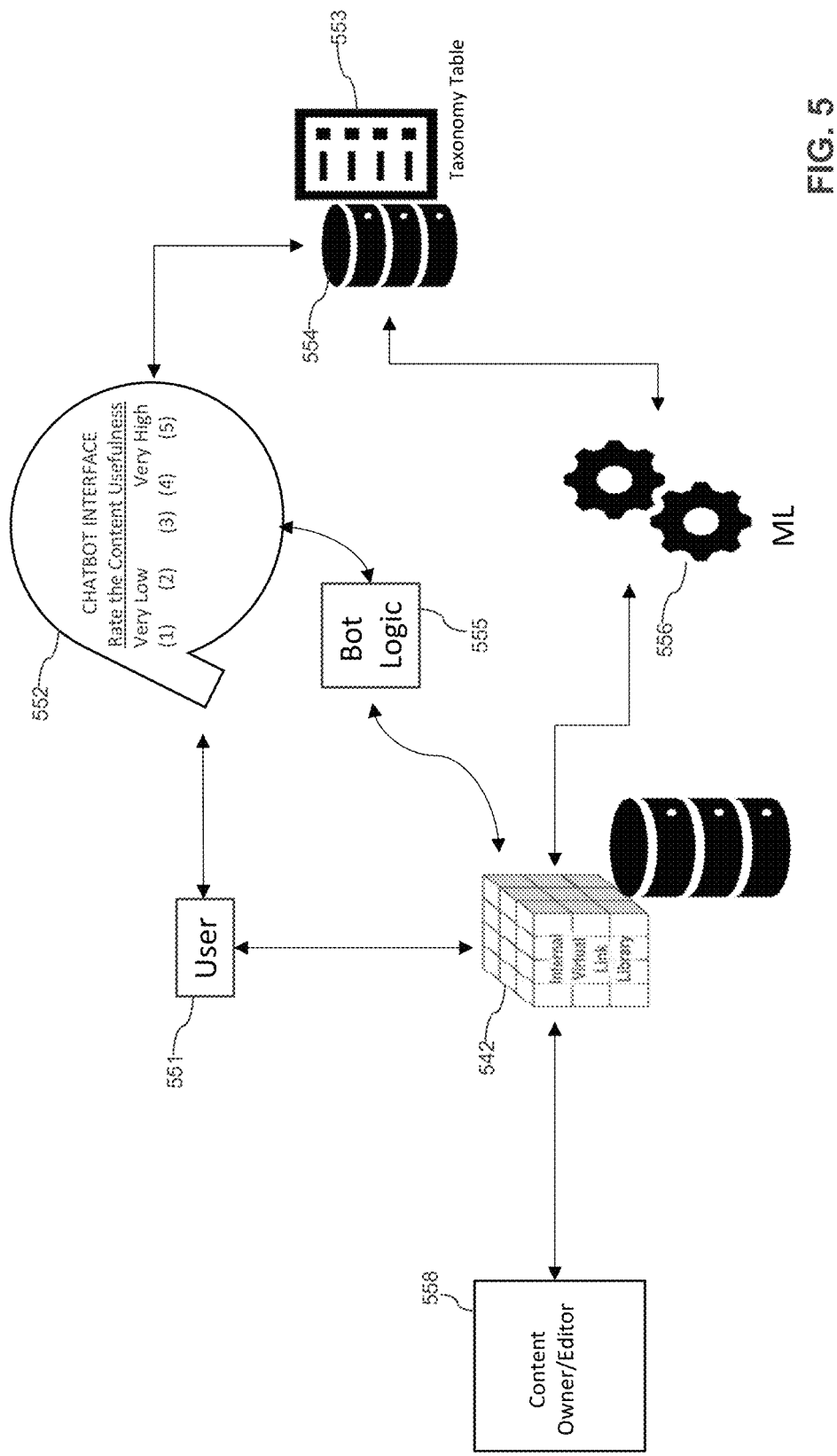
FIG. 5 is an operational flow diagram for using a chatbot to process customer feedback in an illustrative embodiment.

Referring to FIGS. 1 and 5, a user 551 via, for example, one of the user devices 102, provides feedback via a chatbot interface 552 regarding a given electronic content item of the plurality of electronic content items, wherein the given electronic content item corresponds to a first set of the plurality of metadata tags. According to an embodiment, the feedback comprises a rating of the usefulness of the electronic content item to the user. As shown in FIG. 5, the usefulness or satisfaction with the content is rated on a numerical scale (e.g., "1" corresponding to "very low" usefulness/satisfaction, and "5" corresponding to "very high" usefulness satisfaction). A score and tag capture component 141 captures the scores (ratings) provided by users for a plurality of electronic content items, and the corresponding metadata tags/labels of the electronic content items and stores the captured scores and tags in a database 554 in the form of, for example, a taxonomy table 553.

Using bot logic 555 and ML techniques 556, a recommendation for the user based on the feedback is generated by the user content recommendation component 144. The recommendation comprises another given electronic content item of the plurality of electronic content items corresponding to a second set of the plurality of metadata tags. If the feedback is positive (e.g., "very high"), the second set of the plurality of metadata tags of the recommended content item is similar to the first set of the plurality of metadata tags in order to recommend similar content that may be equally useful. If the feedback is negative (e.g., "very low"), the second set of the plurality of metadata tags of the recommended content item differs from the first set of the plurality of metadata tags in order to recommend different content that may be more useful. The recommended content items are accessed from the virtual link library 142/542, which stores the relationships between the electronic content items and the tags/labels generated in accordance with the standardized taxonomy. According to an embodiment, a content owner feedback component 143 generates information concerning a rating below a predetermined threshold for the given electronic content item to be transmitted to content owners/editors 558 via one or more of the plurality of content management systems 103. With this information, content owners/editors 558 may delete or change the low-rated content items.

The ML chatbot interface 552 permits real-time communication with users that receive electronic content to get their feedback. In addition, the ML techniques 556 and bot logic 555 analyze the feedback so that electronic content items will be ranked higher or lower when associated with a particular tag/label. For example, if two electronic content items are associated with the same tag/label, an electronic content item with a higher usefulness score will be ranked higher than an electronic content item with a lower usefulness score when associated with that tag/label.

Figure 9:
FIG. 9 depicts an example chatbot interface screenshot for feedback in an illustrative embodiment.

FIG. 9 depicts an example chatbot interface screenshot 900 for feedback. The screenshot shows the types of questions that may be asked of a user in connection with different electronic content items and scored responses based on a scale from 0 to 1.

The microservice architecture supporting feedback and model correction is described in connection with FIG. 2. Referring to FIG. 2, feedback, accuracy and correction microservices 290 are utilized to process feedback, including, for example, customer views, opinions and other feedback regarding received content, and provide the feedback data to the application registration and modelling microservices 250 for modification of the model to generate the standardized taxonomy. The derivation component 263 of the application registration and modelling microservices 250 includes the input/output testing component 269, which receives input from an application model scoring microservice component 293 of the feedback, accuracy and correction microservices 290 regarding modifications to make to the model based on feedback from customers and scoring. The applications feedback microservice component 291 processes the customer views, opinions and other feedback regarding received content. The feedback metadata microservice 295 stores and maintains metadata associated with the feedback received from the applications feedback microservice component 291. Based on the processed feedback received from the applications feedback microservice component 291, the application model scoring microservice component 293 uses ML techniques to compute scores measuring the effectiveness of the model for generating a taxonomy which provides content to customers that the customers may want. The scores are transmitted to the input/output testing component 269, which adjusts the model (e.g., mapping data 259) based on whether the scores indicate relatively low or high performance of the model. The feedback, accuracy and correction microservices 290 further includes a dashboard microservice component 294 which provides a visualization for a user, such as an administrator of the content marketing platform 110, to view the model scores and feedback, and track the progress of the taxonomy.

The databases or libraries 142, 354, 357, 452, 542 and 554 in some embodiments are implemented using one or more storage systems or devices associated with the content marketing platform 110. In some embodiments, one or more of the storage systems utilized to implement the databases or libraries 142, 354, 357, 452, 542 and 554 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, NAS, storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the content marketing platform 110, the query processing engine 115, ML content classification engine 120, ML image extraction and classification engine 130 and/or ML chatbot engine 140 in other embodiments can be implemented at least in part externally to the content marketing platform 110, for example, as stand-alone servers, sets of servers or other types of systems coupled to the network 104. For example, the query processing engine 115, ML content classification engine 120, ML image extraction and classification engine 130 and/or ML chatbot engine 140 may be provided as cloud services accessible by the content marketing platform 110.

The query processing engine 115, ML content classification engine 120, ML image extraction and classification engine 130 and ML chatbot engine 140 in the FIG. 1 embodiment are each assumed to be implemented using at least one processing device. Each such processing device generally comprises at least one processor and an associated memory, and implements one or more functional modules for controlling certain features of the query processing engine 115, ML content classification engine 120, ML image extraction and classification engine 130 and/or ML chatbot engine 140.

At least portions of the content marketing platform 110 and the components thereof may be implemented at least in part in the form of software that is stored in memory and executed by a processor. The content marketing platform 110 and the components thereof comprise further hardware and software required for running the content marketing platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the query processing engine 115, ML content classification engine 120, ML image extraction and classification engine 130, ML chatbot engine 140 and other components of the content marketing platform 110 in the present embodiment are shown as part of the content marketing platform 110, at least a portion of the query processing engine 115, ML content classification engine 120, ML image extraction and classification engine 130, ML chatbot engine 140 and other components of the content marketing platform 110 in other embodiments may be implemented on one or more other processing platforms that are accessible to the content marketing platform 110 over one or more networks. Such components can each be implemented at least in part within another system element or at least in part utilizing one or more stand-alone components coupled to the network 104.

It is assumed that the content marketing platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the query processing engine 115, ML content classification engine 120, ML image extraction and classification engine 130, ML chatbot engine 140 and other components of the content marketing platform 110, and the elements thereof can each be implemented in the form of one or more LXCs running on one or more VMs. Other arrangements of one or more processing devices of a processing platform can be used to implement the query processing engine 115, ML content classification engine 120, ML image extraction and classification engine 130 and ML chatbot engine 140, as well as other components of the content marketing platform 110. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the content marketing platform 110 to reside in different data centers. Numerous other distributed implementations of the content marketing platform 110 are possible.

Accordingly, one or each of the query processing engine 115, ML content classification engine 120, ML image extraction and classification engine 130, ML chatbot engine 140 and other components of the content marketing platform 110 can each be implemented in a distributed manner so as to comprise a plurality of distributed components implemented on respective ones of a plurality of compute nodes of the content marketing platform 110.

It is to be appreciated that these and other features of illustrative embodiments are presented by way of example only, and should not be construed as limiting in any way.

Accordingly, different numbers, types and arrangements of system components such as the query processing engine 115, ML content classification engine 120, ML image extraction and classification engine 130, ML chatbot engine 140 and other components of the content marketing platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the content marketing platform can be offered to cloud infrastructure customers or other users as part of FaaS, CaaS and/or PaaS offerings.

Figure 10:
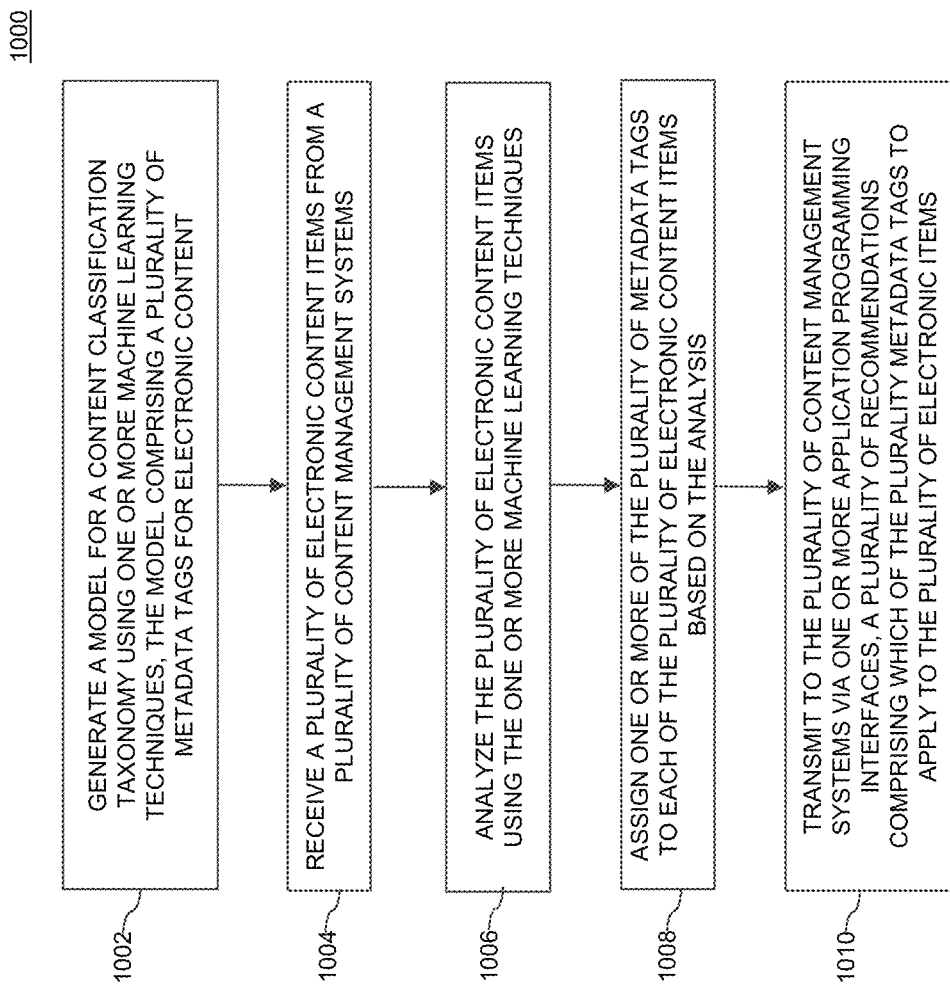
FIG. 10 is a flow diagram of a method for classifying and recommending content in an illustrative embodiment.

The operation of the information processing system 100 will now be described in further detail with reference to the flow diagram of FIG. 10. With reference to FIG. 10, a process 1000 for classifying and recommending content as shown includes steps 1002 through 1010, and is suitable for use in the system 100 but is more generally applicable to other types of information processing systems comprising a content marketing platform configured for classifying and recommending content.

In step 1002, a model for a content classification taxonomy is generated using one or more ML techniques. The model includes a plurality of metadata tags/labels for electronic content.

In step 1004, a plurality of electronic content items are received from a plurality of content management systems, and in step 1006, the plurality of electronic content items are analyzed using the one or more ML techniques. The electronic content items are in a plurality of formats such as, for example, electronic documents, video files, audio files and audio/video files.

Referring to block 1008, one or more of the plurality of metadata tags are assigned to each of the plurality of electronic content items based on the analysis. The plurality of metadata tags may be formatted as a plurality of virtual links, each virtual link comprising a plurality of URL segments.

In step 1010, the process 1000 further includes transmitting to the plurality of content management systems via one or more APIs, a plurality of recommendations comprising which of the plurality metadata tags to apply to the plurality of electronic content items.

The process may also include receiving feedback from a user regarding a given electronic content item of the plurality of electronic content items, wherein the given electronic content item corresponds to a first set of the plurality of metadata tags. A recommendation for the user can be generated based on the feedback, the recommendation comprising another given electronic content item of the plurality of electronic content items corresponding to a second set of the plurality of metadata tags, wherein the recommendation is further based on the second set of the plurality of metadata tags. The generation of the recommendation includes an analysis of the feedback using one or more ML chatbots.

Images may be extracted from a given electronic content item of the plurality of electronic content items, wherein at least one of the plurality metadata tags is assigned to the image. ML techniques can be used to determine whether one or more of the plurality of electronic content items other than the given electronic content item is related to the extracted image.

It is to be appreciated that the FIG. 10 process and other features and functionality described above can be adapted for use with other types of information systems configured to execute content classification and recommendation services on a content marketing platform or other type of processing platform.

The particular processing operations and other system functionality described in conjunction with the flow diagram of FIG. 10 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 10 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a content marketing platform as disclosed herein can provide a number of significant advantages relative to conventional arrangements. For example, one or more embodiments are configured to provide an overall taxonomy implementation by combining an optimized ML framework using a hybrid of functionalities and algorithms such as, for example, deep learning, computer vision and chatbot techniques. The embodiments advantageously combine and classify content with high levels of accuracy to autonomously add smart tags to electronic content and suggest tag labels to content management systems in terms of topic, specialty and substance.

Existing content marketing products and/or solutions fail to implement a standardized taxonomy by using a hybrid of ML techniques, and fail to use chatbots as a feedback mechanism to recommend personalized content marketing materials. Unlike conventional approaches, the embodiments provide an assorted and cognitive stepwise pipeline for ML framework implementation as an intelligent support mechanism for content marketing units. The embodiments optimize automatic tagging of content across various platforms with ML opening avenues for aggregated analyses of content performance. The embodiments also advantageously provide for customization and navigation based on information fed back from customer resource management (CRM) systems, web traffic, splunk logs and other runtime applications.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the content marketing platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a content marketing platform in illustrative embodiments. These and other cloud-based systems in illustrative embodiments can include object stores.

Illustrative embodiments of processing platforms will now be described in greater detail with reference to FIGS. 11 and 12. Although described in the context of system 100, these platforms may also be used to implement at least portions of other information processing systems in other embodiments.

Figure 11:
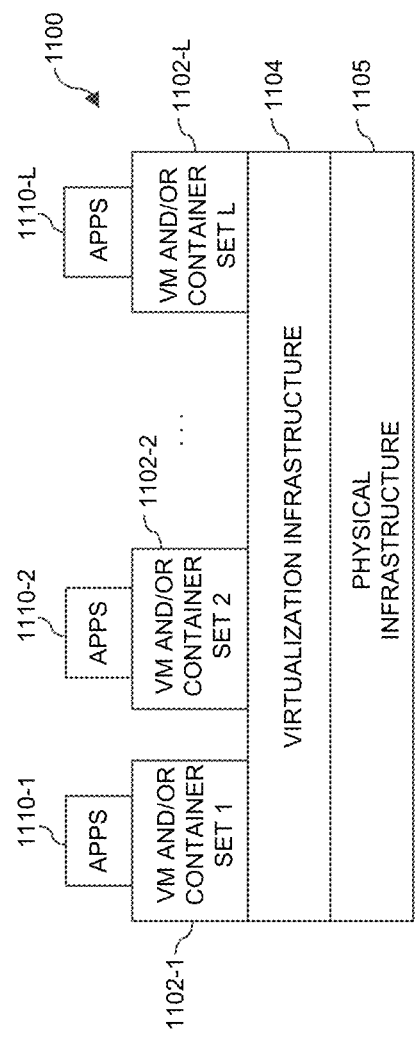
FIGS. 11 and 12 show examples of processing platforms that may be utilized to implement at least a portion of an information processing system in illustrative embodiments.
Figure 12:
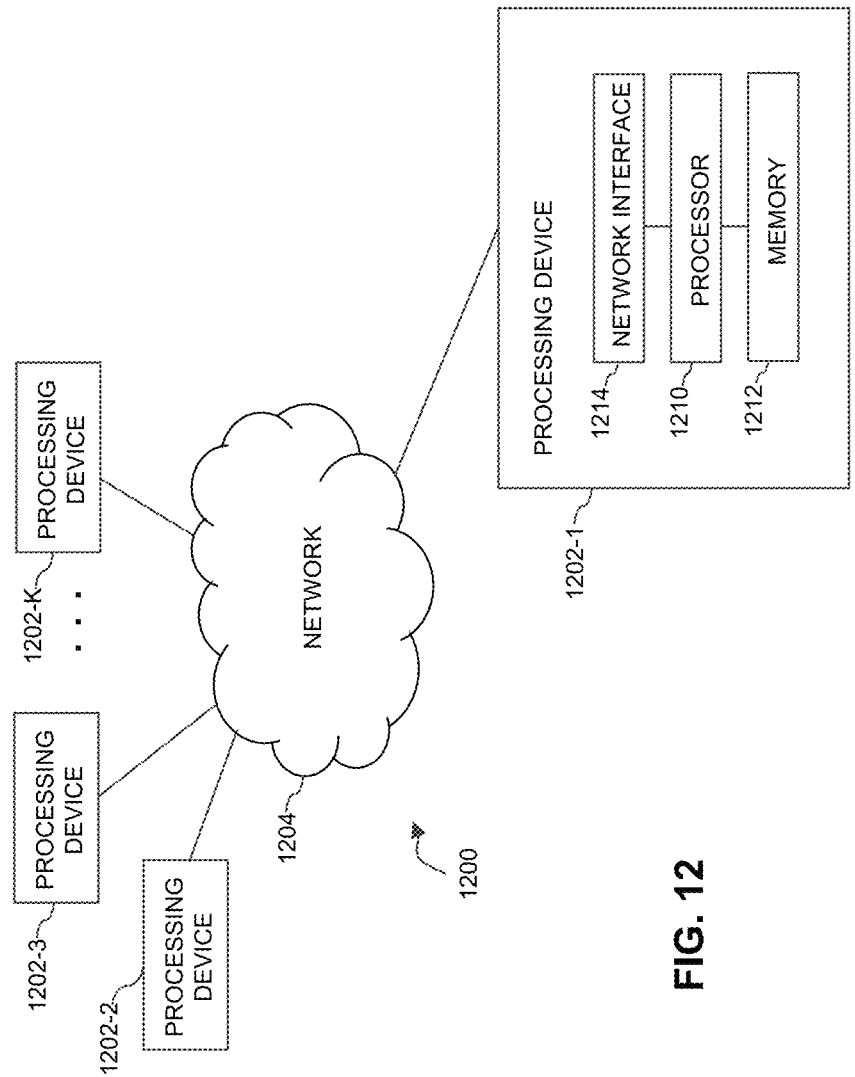

FIG. 11 shows an example processing platform comprising cloud infrastructure 1100. The cloud infrastructure 1100 comprises a combination of physical and virtual processing resources that may be utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. A hypervisor platform may be used to implement a hypervisor within the virtualization infrastructure 1104, where the hypervisor platform has an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212. The processor 1210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the content marketing platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and content marketing platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising a plurality of processing devices;
said at least one processing platform being configured:
to generate a model for a content taxonomy using one or more machine learning techniques, the model comprising a plurality of metadata tags for electronic content;
to receive a plurality of electronic content items from a plurality of content management systems;
to organize the plurality of electronic content items based at least in part on one or more relationships between: (i) the plurality of electronic content items and one or more customers; and (ii) the plurality of electronic content items and one or more of the plurality of metadata tags;

to analyze the plurality of electronic content items using the one or more machine learning techniques, wherein in performing the analyzing, said at least one processing platform is configured to apply machine learning clustering techniques to identify groups of the one or more customers in relation to one or more of the plurality of electronic content items;

to generate a model of the plurality of metadata tags, wherein the model defines groups of at least one of synonyms and context matches between the plurality of metadata tags;

to assign one or more of the plurality of metadata tags to each of the plurality of electronic content items based at least in part on the identified groups of the one or more customers in relation to the one or more of the plurality of electronic content items, and on the defined groups of at least one of the synonyms and the context matches between the plurality of metadata tags;

to transmit to the plurality of content management systems via one or more application programming interfaces, a plurality of recommendations comprising which of the plurality of metadata tags to apply to the plurality of electronic content items; and to receive feedback from one or more users regarding usefulness of the one or more of the plurality of electronic content items;

wherein, in generating the model for content taxonomy, said at least one processing platform is configured to utilize a microservices architecture comprising an input microservice component configured to receive predefined conditions for the content taxonomy and a derivation microservice component configured to use the one or more machine learning techniques to generate derived conditions for the content taxonomy from one or more content sources;

wherein the derivation microservice component comprises a testing microservice component;

wherein the microservices architecture further comprises a feedback microservices component configured to process the feedback; and wherein the testing microservice component is configured to adjust data mapping of one or more relationships of the content taxonomy based at least in part on the feedback.

2. The apparatus of claim 1 wherein:

the feedback corresponds to a given electronic content item of the plurality of electronic content items, wherein the given electronic content item corresponds to a first set of the plurality of metadata tags;

said at least one processing platform is further configured to generate a recommendation for the one or more users based on the feedback, the recommendation comprising another given electronic content item of the plurality of electronic content items corresponding to a second set of the plurality of metadata tags; and the recommendation is further based on the second set of the plurality of metadata tags.

3. The apparatus of claim 2 wherein, in generating the recommendation for the one or more users, said at least one processing platform is configured to analyze the feedback using one or more machine learning chatbots.

4. The apparatus of claim 2 wherein said at least one processing platform is further configured to transmit to one or more of the plurality of content management systems information concerning a rating below a predetermined threshold for the given electronic content item, wherein the rating is part of the feedback.

5. The apparatus of claim 1 wherein said at least one processing platform is further configured:

to extract an image from a given electronic content item of the plurality of electronic content items; and to assign at least one of the plurality of metadata tags to the image.

6. The apparatus of claim 5 wherein said at least one processing platform is further configured use the one or more machine learning techniques to determine whether another one of the plurality of electronic content items other than the given electronic content item is related to the extracted image.

7. The apparatus of claim 1 wherein, in generating the model for the content taxonomy, said at least one processing platform is further configured to use the one or more machine learning techniques to create a plurality of combinations of at least one of keywords and key phrases.

8. The apparatus of claim 7 wherein the one or more machine learning techniques comprise at least one of a Word2vec technique, a bag of words (BoW) technique and a term frequency-inverse document frequency (tf-idf) technique.

9. The apparatus of claim 7 wherein, in generating the model for the content taxonomy, said at least one processing platform is further configured to compute a plurality of term frequency-inverse document frequency (tf-idf) scores for the plurality of combinations.

10. The apparatus of claim 1 wherein the content taxonomy comprises a hierarchical taxonomy.

11. The apparatus of claim 1 wherein the plurality of electronic content items are in a plurality of formats comprising at least one of an electronic document, a video file, an audio file and an audio/video file.

12. The apparatus of claim 1 wherein said at least one processing platform is further configured to format the plurality of metadata tags as a plurality of virtual links, each virtual link comprising a plurality of uniform resource locator (URL) segments.

13. A method comprising:

generating a model for a content taxonomy using one or more machine learning techniques, the model comprising a plurality of metadata tags for electronic content;

receiving a plurality of electronic content items from a plurality of content management systems;

organizing the plurality of electronic content items based at least in part on one or more relationships between: (i) the plurality of electronic content items and one or more customers; and (ii) the plurality of electronic content items and one or more of the plurality of metadata tags;

analyzing the plurality of electronic content items using the one or more machine learning techniques, wherein the analyzing comprises applying machine learning clustering techniques to identify groups of the one or more customers in relation to one or more of the plurality of electronic content items;

generating a model of the plurality of metadata tags, wherein the model defines groups of at least one of synonyms and context matches between the plurality of metadata tags;

assigning one or more of the plurality of metadata tags to each of the plurality of electronic content items based at least in part on the identified groups of the one or more customers in relation to the one or more of the plurality of electronic content items, and on the defined groups of at least one of the synonyms and the context matches between the plurality of metadata tags;

transmitting to the plurality of content management systems via one or more application programming interfaces, a plurality of recommendations comprising which of the plurality of metadata tags to apply to the plurality of electronic content items; and receiving feedback from one or more users regarding usefulness of the one or more of the plurality of electronic content items;

wherein generating the model for content taxonomy comprises utilizing a microservices architecture comprising an input microservice component configured to receive pre-defined conditions for the content taxonomy and a derivation microservice component configured to use the one or more machine learning techniques to generate derived conditions for the content taxonomy from one or more content sources;

wherein the derivation microservice component comprises a testing microservice component;

wherein the microservices architecture further comprises a feedback microservices component configured to process the feedback;

wherein the testing microservice component is configured to adjust data mapping of one or more relationships of the content taxonomy based at least in part on the feedback; and wherein the method is performed by at least one processing platform comprising at least one processing device comprising a processor coupled to a memory.

14. The method of claim 13 wherein:

the feedback corresponds to a given electronic content item of the plurality of electronic content items, wherein the given electronic content item corresponds to a first set of the plurality of metadata tags;

the method further comprises generating a recommendation for the one or more users based on the feedback, the recommendation comprising another given electronic content item of the plurality of electronic content items corresponding to a second set of the plurality of metadata tags; and the recommendation is further based on the second set of the plurality of metadata tags.

15. The method of claim 14 wherein generating the recommendation for the one or more users comprises analyzing the feedback using one or more machine learning chatbots.

16. The method of claim 14 further comprising transmitting to one or more of the plurality of content management systems information concerning a rating below a predetermined threshold for the given electronic content item, wherein the rating is part of the feedback.

17. The method of claim 13 further comprising:

extracting an image from a given electronic content item of the plurality of electronic content items; and assigning at least one of the plurality of metadata tags to the image.

18. A computer program product comprising a non-transitory processor-readable storage medium having stored therein program code of one or more software programs, wherein the program code when executed by at least one processing platform causes said at least one processing platform:

to generate a model for a content taxonomy using one or more machine learning techniques, the model comprising a plurality of metadata tags for electronic content;

to receive a plurality of electronic content items from a plurality of content management systems;

to organize the plurality of electronic content items based at least in part on one or more relationships between: (i) the plurality of electronic content items and one or more customers; and (ii) the plurality of electronic content items and one or more of the plurality of metadata tags;

to analyze the plurality of electronic content items using the one or more machine learning techniques, wherein in performing the analyzing, the program code further causes said at least one processing platform to apply machine learning clustering techniques to identify groups of the one or more customers in relation to one or more of the plurality of electronic content items;

to generate a model of the plurality of metadata tags, wherein the model defines groups of at least one of synonyms and context matches between the plurality of metadata tags;

to assign one or more of the plurality of metadata tags to each of the plurality of electronic content items based at least in part on the identified groups of the one or more customers in relation to the one or more of the plurality of electronic content items, and on the defined groups of at least one of the synonyms and the context matches between the plurality of metadata tags;

to transmit to the plurality of content management systems via one or more application programming interfaces, a plurality of recommendations comprising which of the plurality of metadata tags to apply to the plurality of electronic content items; and to receive feedback from one or more users regarding usefulness of the one or more of the plurality of electronic content items;

wherein, in generating the model for content taxonomy, the program code causes said at least one processing platform to utilize a microservices architecture comprising an input microservice component configured to receive pre-defined conditions for the content taxonomy and a derivation microservice component configured to use the one or more machine learning techniques to generate derived conditions for the content taxonomy from one or more content sources;

wherein the derivation microservice component comprises a testing microservice component;

wherein the microservices architecture further comprises a feedback microservices component configured to process the feedback; and wherein the testing microservice component is configured to adjust data mapping of one or more relationships of the content taxonomy based at least in part on the feedback.

19. The computer program product according to claim 18 wherein the program code further causes said at least one processing platform:

the feedback corresponds to a given electronic content item of the plurality of electronic content items, wherein the given electronic content item corresponds to a first set of the plurality of metadata tags;

the program code further causes said at least one processing platform to generate a recommendation for the one or more users based on the feedback, the recommendation comprising another given electronic content item of the plurality of electronic content items corresponding to a second set of the plurality of metadata tags; and the recommendation is further based on the second set of the plurality of metadata tags.

20. The computer program product according to claim 18 wherein the program code further causes said at least one processing platform:
  to extract an image from a given electronic content item of the plurality of electronic content items; and
  to assign at least one of the plurality of metadata tags to the image.

* * * * *